United States Patent [19]

Miyamoto et al.

[11] 4,316,131
[45] Feb. 16, 1982

[54] CONTROL APPARATUS OF FLYING SHEARS

[75] Inventors: Tsutomu Miyamoto, Hachioji; Takayuki Matsudaira, Tokyo, both of Japan

[73] Assignee: Tokyo Shibaura Denki Kabushiki Kaisha, Kanagawa, Japan

[21] Appl. No.: 963,396

[22] Filed: Nov. 24, 1978

[30] Foreign Application Priority Data

Nov. 30, 1977 [JP] Japan ............... 52-143387

[51] Int. Cl.³ ............... G05B 5/01
[52] U.S. Cl. ............... 318/612; 318/614; 318/616
[58] Field of Search ............... 318/612, 614, 39, 616, 318/617, 618; 192/12 D, 17 C, 18 B; 83/285

[56] References Cited

U.S. PATENT DOCUMENTS 3,587,798  6/1971  Schuman .......... 192/12 D
3,811,354  5/1974  Ito .......... 83/285
3,886,830  6/1975  Holthoff et al. .......... 83/285

Primary Examiner—S. J. Witkowski
Assistant Examiner—Eugene S. Indyk
Attorney, Agent, or Firm—Stevens, Davis, Miller & Mosher

[57] ABSTRACT

In a control apparatus of a flying shear wherein a clutch is actuated to transmit the rotation of a drive motor to a cutting blade to rotate the same for achieving cutting and then the clutch is disengaged and the cutting blade is stopped by means of a brake, there are provided a speed signal generator for generating a signal corresponding to the speed of the cutting blade, a rest point establishing device for establishing a rest point for the cutting blade, an operation circuit receiving the output of the speed signal generator and performing an operation, and an instruction circuit responsive to the output of the operation circuit and the output of the rest point establishing device to produce at least one of an instruction for declutching and an instruction for braking.

13 Claims, 7 Drawing Figures

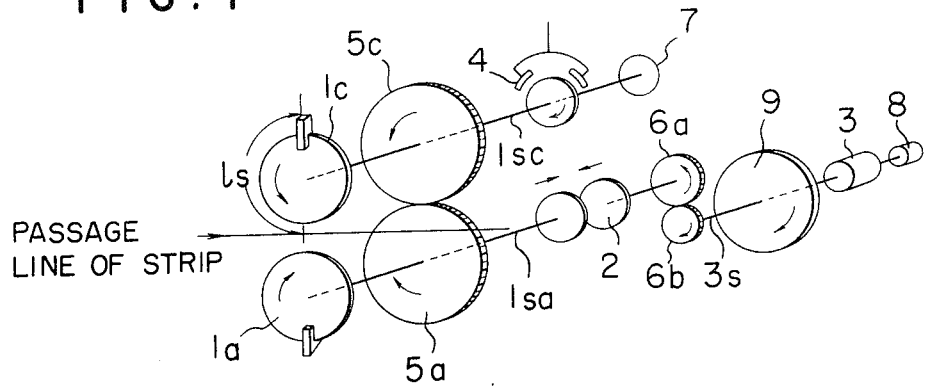
FIG. I
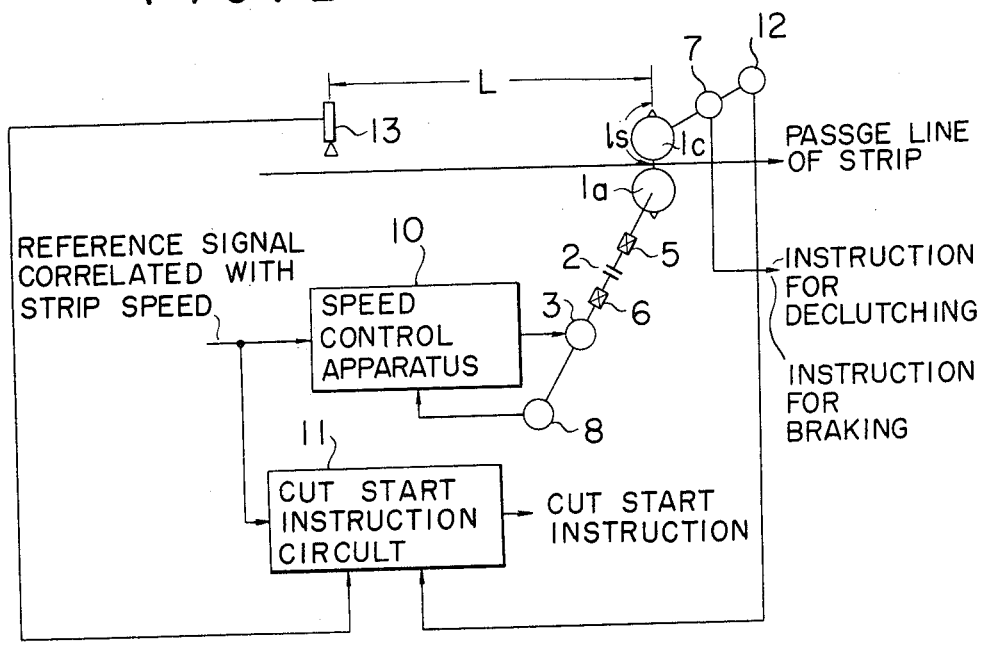
FIG. 2

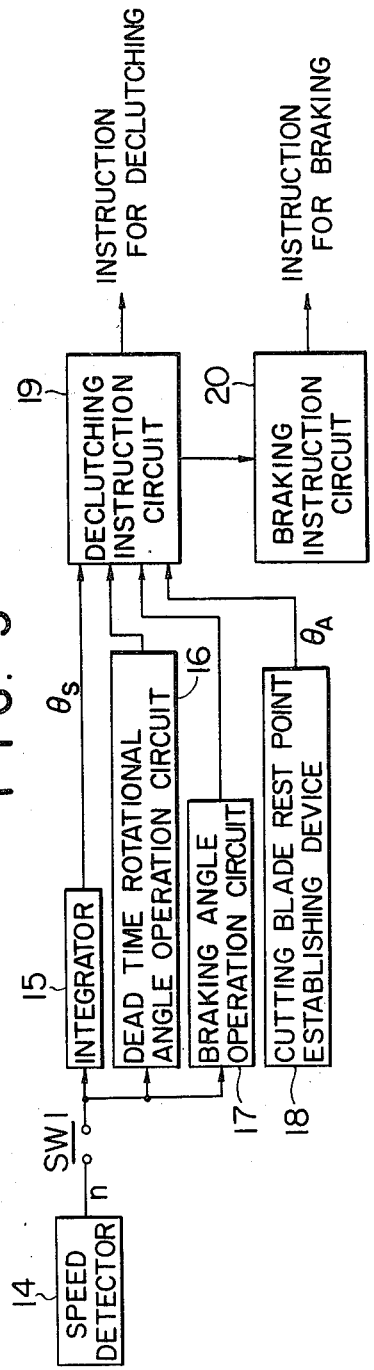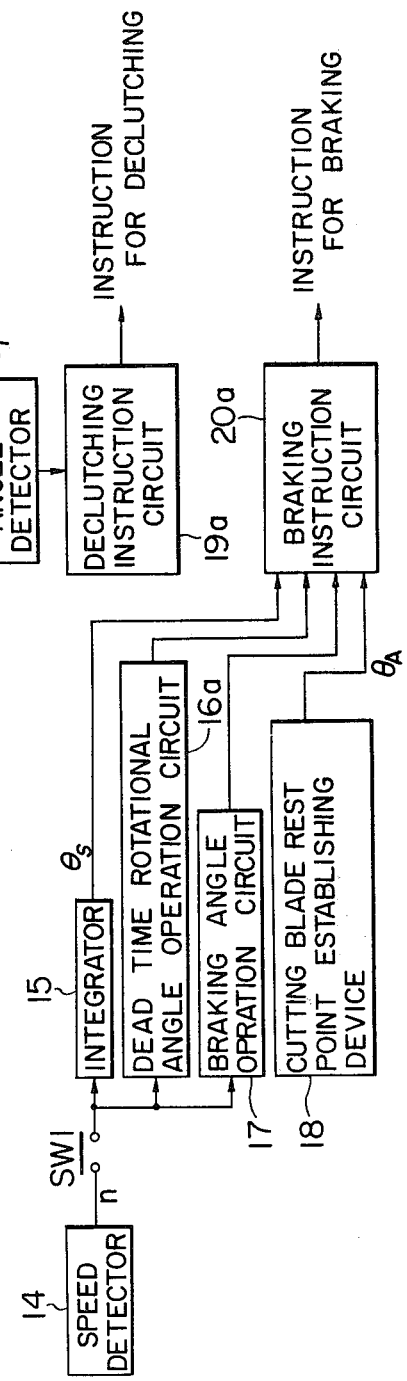

CONTROL APPARATUS OF FLYING SHEARS

BACKGROUND OF THE INVENTION

This invention relates to control apparatus of a flying shear which cuts a strip material running along a process line.

A flying shear of this type is used to cut the leading end and the trailing end as well as intermediate points of a metal strip produced by a rolling mill, for example, and has had a construction as diagrammatically shown in FIG. 1. As shown, two cutting blades $1_a$ and $1_c$ are disposed in a common plane and provided with meshing gears $5_a$ and $5_c$ on shafts $1_{sa}$ and $1_{sc}$ so as to rotate in opposite directions. An electric motor 3 is provided for driving the cutting blades $1_a$ through gears $6_a$, $6_b$ and a clutch 2. The speed of the motor 3 is controlled by a signal generated by a tachometer generator 8 mounted on the motor shaft $3_s$ so that the motor speed is always proportioned to the strip speed. A brake 4 is mounted on the shaft $1_{sc}$ of the cutting blade $1_c$ so as to apply braking force upon both cutting blades $1_a$ and $1_c$. A rotational angle detector 7 is mounted on the rear end of the shaft $1_{sc}$.

During the operation of the flying shear, cutting is commenced by disengaging the brake 4 and actuating the clutch 2 to transmit rotation of the motor 3 to the upper and lower cutting blades $1_c$ and $1_a$. As the upper and lower cutting blades $1_c$ and $1_a$ meet each other and the cutting is completed, the clutch 2 is disengaged and thereafter the brake 4 is actuated so that the cutting blades $1_c$, $1_a$ are brought to a standstill at the original position.

The flying shear of the type mentioned above is generally called clutch-brake type shear. Since the motor 3 is kept rotating regardless of whether the cutting is being effected or not, a flywheel 9 can be mounted on the motor shaft $3_s$, and the energy stored in the flywheel 9 can be utilized for the cutting, so that the capacity of the motor 3 can be reduced compared with the start-stop type shear wherein the cutting blades $1_c$ and $1_a$ are always kept coupled to the motor shaft $3_s$ and the motor 3 is rotated only during the cutting. The clutch 2 and the brake 4 are usually pneumatically operated and controlled by electromagnetic valves in view of mechanical convenience and desired operational speed.

FIG. 2 shows the above-mentioned flying shear incorporated into a process line. A speed control apparatus 10 controls the speed of the motor 3 in response to a reference signal correlated with the movement of the strip and a feedback signal from the tachometer generator 8 which detects the speed of the motor 3. A cut start instruction circuit 11 receives a reference signal correlated with the strip speed and a strip detection signal from a strip detector 13 and performs operation on these signals to produce an output signal for instructing the commencement of the cutting. The operation performed by the cut instruction circuit may vary according to the particular requirement. An example of such operation is described below.

Assuming that L represents the distance from the strip detector 13 to the cutting point (where the cutting is conducted) of the shear, $l_s$ the locus of tip of the cutting blades $1_a$, $1_c$ from the rest point to the cutting point, l the desired length of each cut, v the speed of the strip, k the speed lead rate of the cutting blades $1_a$, $1_c$ relative to the strip speed (at the instance of cutting), $\alpha$ the rate of acceleration at which the cutting blades $1_a$, $1_c$ are accelerated by the clutch torque during the time since the clutch 2 is actuated and until the cutting blades $1_a$, $1_c$ are synchronized with the motor speed, and $t_d$ the dead time which elapses since the cutting instruction is given and before the cutting blades actually begin to move. When the leading end or the trailing end of the strip is detected by the strip detector 13, integration operation of the strip speed is commenced. As the integral, i.e., the distance over which the strip has so far travelled satisfies the following equation, the cut start instruction signal is generated.

$$\int_o^t v\,dt = L \pm l - \frac{1}{K}\left(l_s + \frac{k^2v^2}{2\alpha}\right) - v \cdot t_d \quad (1)$$

In the equation (1), the sign before "l" is plus where the leading end of the strip is detected, and the sign before "l" is minus where the trailing end of the strip is detected. The third term of the right side:

$$\frac{1}{k}\left(l_s + \frac{k^2v^2}{2\alpha}\right)$$

is the distance over which the strip proceeds during the time since the cutting blades begin rotation and before it reaches the cutting point. The fourth term of the right side:

$$v \cdot t_d$$

is the distance over which the strip proceeds during the dead time. When the cut start instruction is generated, the brake 4 is disabled and then the clutch 2 is actuated, and accordingly the cutting blades $1_a$, $1_c$ are rotated to cut the strip.

When the cutting is completed, the rotational angle detector 7 (usually comprising a set of limit switches) detects a mechanically predetermined point at which the clutch 2 is to be disengaged and another mechanically predetermined point at which the brake 4 is to be actuated, and thereby the clutch 2 is disengaged and the brake 4 is thereafter actuated to stop the rotation of the cutting blades. The points at which the rotational angle detector 7 generates the instruction for disengaging the clutch and the instruction for actuating the brake are both fixed. As a result, when the motor speed is changed in conformity with a change of the strip speed, the angle over which the cutting blades rotate since the instruction for disengaging the clutch and before the cutting blades actually come to a stand is not constant and the cutting blades rest at varying positions. It will be understood from the equation (1) above, that the variation of the rest position means the variation in the locus $l_s$ of the tips of the cutting blades from the rest position to the cutting position, and hence it affects the length of each cut of the strip.

To eliminate such defects and to enhance the accuracy of the length of the cut of the strip, a conventional technique employs a system wherein the detection points at which the rotational angle detector 7 produces the instruction for declutching and the instruction for braking can be selected among several positions, depending on the speed of the strip. The rotational angle detector comprises, for example, a rotary cam limit switch having six pairs of contacts, the operating angle of each pair being adjustable independently of each other. The detection points can be selected among the corresponding positions of the pairs of contacts, depending on the speed. If the different detection points are required depending upon whether the speed is high, middle or low (as is usual) six pairs of contacts are needed for the control. Consequently, if additional pairs of contacts are required for other sequential controls, an additional rotary cam limit switch has to be provided.

The provision of two rotary cam limit switches will increase the length of the cutting blade shaft. Since the acceleration of the cutting blade shaft is great, the torsion of the shaft is problematical and the rotary cam limit switch may be damaged. It will be seen that there is a limit to the number of limit switches which can be provided, and hence the rest point of the cutting blades is undesirably affected by the change of the line speed.

SUMMARY OF THE INVENTION

An object of the invention is to provide a solution to the above described problems.

Another object of the invention is to provide a control apparatus of a flying shear whereby the rest point of the cutting blades is fixed even if the line speed is changed and the accuracy of the length of the cut of the material strip is enhanced.

According to the invention, there is provided a control apparatus of a flying shear wherein a clutch is actuated to transmit the rotation of a drive motor to a cutting blade to rotate the same for achieving cutting and then the clutch is disengaged and the cutting blade is stopped by means of a brake, wherein there are provided: a speed signal generator for generating a signal corresponding to the speed of the cutting blade, a rest point establishing device for establishing a rest point for the cutting blade, an operation circuit receiving the output of the speed signal generator and performing an operation, and an instruction circuit responsive to the output of the operation circuit and the output of the rest point establishing device to produce at least one of an instruction for declutching and an instruction for braking.

BRIEF DESCRIPTION OF THE DRAWINGS

In the drawings;

FIG. 1 shows a general construction of an example of a clutch-brake type flying shear, FIG. 2 shows the flying shear of FIG. 1 incorporated in a process line and provided with a conventional control apparatus.

DESCRIPTION OF THE PREFERRED EMBODIMENTS

Figure 3:
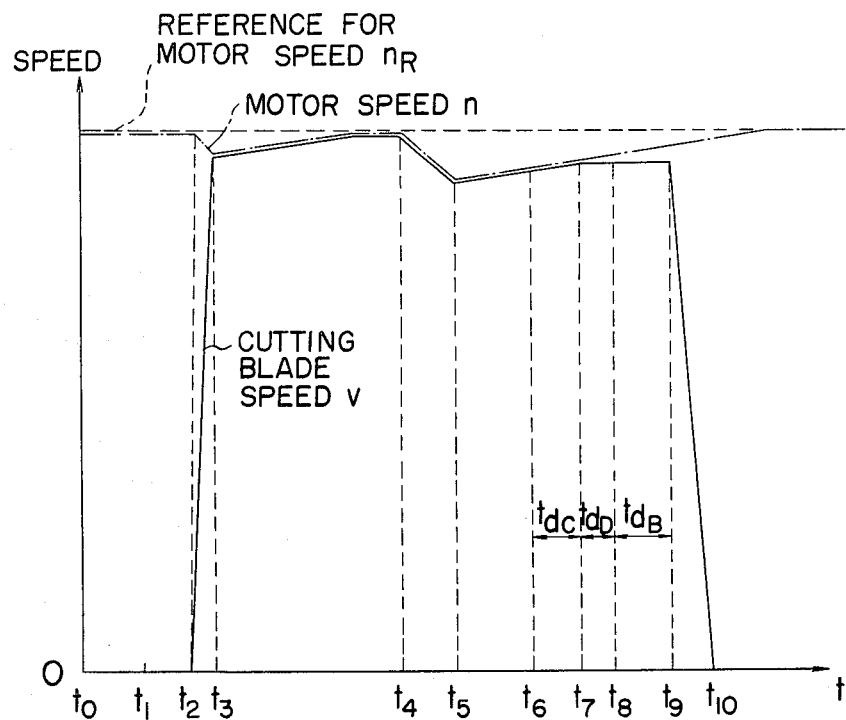
FIG. 3 is a graph showing a relationship between the cutting blade speed v and the motor speed n.

The principle of the invention will be described with reference to FIGS. 3 and 4. FIG. 3 shows the relationship between variation of the speed n of the motor 3 and variation of the speed v of the cutting blade. In FIG. 3, $t_0$ indicates the time at which the cutting is commenced (i.e., the time at which the instruction for disabling the brake is produced), $t_1$ the time at which the clutch is instructed to engage, $t_2$ the time at which the clutch actually engages, $t_3$ the time at which the cutting blade speed coincides with the motor speed, $t_4$ the time at which the cutting of the strip is commenced, $t_5$ the time at which the cutting of the strip is completed, $t_6$ the time at which the instruction for declutching is produced, $t_7$ the time at which the clutch actually disengages, $t_8$ the time at which the instruction for braking is produced, $t_9$ the time at which the brake is actually brought into engagement, and $t_{10}$ the time at which the cutting blades are brought into the rest position. The position of the cutting blades at the times $t_{10}$ should accord to the position of the cutting blades at the time $t_0$. The order of the times $t_7$ and $t_8$ may be reversed, depending on the length of the dead time from the instruction for declutching and until the actual declutching. To make the rest point invariable, the times at which the instructions for declutching and for braking should be produced are computed, taking account of the rotational speed v of the cutting blades.

The angle $\theta$ ($=\theta_C+\theta_D+\theta_B+\theta_E$) [in radians] through which the cutting blades $1_a$, $1_c$ rotate since the instruction for declutching is produced and until the cutting blades are brought to a standstill is computed in the following manner. The angle $\theta_c$ through which the cutting blades rotate during the time $t_{dc}$ [sec] since the instruction for declutching is produced and until the clutch is actually disengaged is determined by the following expression:

$$\phi_c = \frac{2\pi}{60} \cdot \frac{(2V_c + \beta t_{dc}) \cdot t_{dc}}{2} \quad (2)$$

wherein $V_c$ [rpm] is the speed of the cutting blades at the time when the instruction for declutching is produced, and $\beta$ [rpm/sec] is the acceleration rate at which the speed of the cutting blades is restored to that proportional to the strip running speed after the cutting.

The time required for the restoration after the cutting is dependent on the response time of the speed control system employed. If a flywheel 9 is mounted on the motor shaft $3_s$ as illustrated, the acceleration rate $\beta$ is sufficiently small to be neglected. Accordingly, if the rotational speed of the cutting blades at the time when the clutch is actually disengaged is $V_0$ [rpm], the expression (2) is rewritten as follows:

$$\phi_c = \frac{2\pi}{60} \cdot V_0 \cdot t_{dc} \quad (3)$$

On the other hand, the angle $\theta_D$ [rad] through which the cutting blades $1_a$, $1_c$ rotate during the period of time $t_{dD}$ [sec] since the time $t_7$ when the clutch 2 actually disengages and until the time $t_8$ when the instruction for braking is produced is given by the following expression:

$$\theta_D = \frac{2\pi}{60}\left(V_0 \cdot t_{dD} - \frac{V_0 \cdot t_{dD}}{\frac{V_0 \cdot GD^2}{375 T_f}} \cdot \frac{t_{dD}}{2}\right) = \quad (4)$$

$$\frac{2\pi}{60} V_0 \cdot t_{dD}\left(1 - \frac{375 T_f}{V_0 \cdot GD^2} \cdot \frac{t_{dD}}{2}\right)$$

wherein $T_f$ [kg.m] is the friction torque of the cutting blades, and $GD^2$ [kg.m$^2$] is the flywheel effect of the cutting blades. The decrease of the speed of the cutting blades due to the friction torque $T_f$ is sufficiently small, so that is can be neglected. Hence, $$\phi_D = \frac{2\pi}{60} \cdot V_0 \cdot t_{dD} \tag{5}$$

The angle $\theta_B$ [rad] through which the cutting blades rotate during the period of time $t_{dB}$ since the time $t_8$ when the instruction for braking is produced and until the time $t_9$ when the brake 4 is actually brought into engagement is given by the following expression, if the friction torque $T_f$ is neglected.

$$\phi_B = \frac{2\pi}{60} \cdot V_0 \cdot t_{dB} \tag{6}$$

The period of time $t_E$ since the brake 4 is actually brought into engagement at $t_9$ and until the cutting blades $1_a$, $1_c$ are brought to a standstill is given by the following expression:

$$t_E = \frac{V_0 \cdot GD^2}{375 T_B} \tag{7}$$

wherein $T_B$ [kg.m] is the brake torque. And, the angle through which the cutting blades rotate during the period of time $t_E$ is given by the following expression:

$$\phi_E = \frac{\pi}{60} \cdot V_0 \cdot t_E = \frac{\pi}{60} \cdot \frac{V_0^2 \cdot GD^2}{375 T_B} \tag{8}$$

Accordingly, the angle $\theta$ through which the cutting blades rotate since the instruction for declutching is produced and until the cutting blades are brought to a standstill is given by the following expression:

$$\phi = \phi_C + \phi_D + \phi_B + \phi_E \tag{9}$$
$$= \frac{2\pi}{60} V_0 (t_{dC} + t_{dD} + t_{dB}) + \frac{\pi}{60} \cdot \frac{V_0^2 \cdot GD^2}{375 T_B}$$

Figure 4:
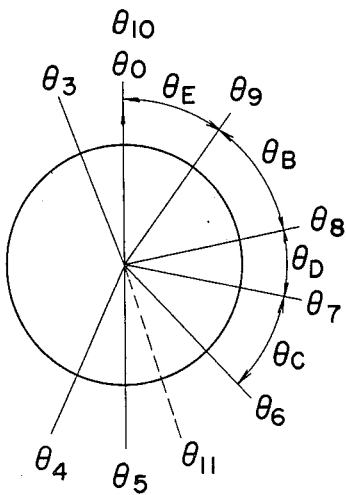
FIG. 4 shows the rotational angle of the cutting blades during cutting, and FIGS. 5 through 7 respectively show block diagrams of different embodiments of the invention.

FIG. 4 shows the relationship between $\theta$, $\theta_C$, $\theta_D$, $\theta_B$ and $\theta_E$. In FIG. 4, $\theta_0$ is the angle at which the cutting blades rest, $\theta_3$ is the angle at which the acceleration of the cutting blades are completed, $\theta_4$ is the angle at which the cutting is commenced, $\theta_5$ is the angle at which the cutting is completed, $\theta_6$ is the angle at which the instruction for declutching is produced, $\theta_7$ is the angle at which the clutch is actually disengaged, $\theta_8$ is the angle at which the instruction for braking is produced, $\theta_9$ is the angle at which the instruction for braking is produced, and $\theta_{10}$ is the angle at which the cutting blades are brought to a standstill. The angle $\theta_{10}$ should accord to the angle $\theta_0$. The above mentioned angles $\theta_C$, $\theta_D$, $\theta_B$ and $\theta_E$ are respectively the angles from $\theta_6$ to $\theta_7$, from $\theta_7$ to $\theta_8$, from $\theta_8$ to $\theta_9$, and from $\theta_9$ to $\theta_{10}$. Now, a reference angle $\theta_{11}$ is taken at a position a little forward in the clockwise direction relative to the angle $\theta_6$, and the reference angle $\theta_{11}$ will be assumed to have the absolute angle value 0 (zero).

The angle from $\theta_{11}$ to $\theta_{10}$ is expressed as $\theta_A$. Then, the angle from $\theta_{11}$ to $\theta_6$ is given by a $\theta_A - \theta$. Accordingly, by having the instruction for declutching produced when the rotational angle $\theta_S$ of the cutting blades as measured from the reference angle $\theta_{11}$ becomes equal to $\theta_A - \theta$, i.e., when the following expression:

$$\theta_S = \theta_A - \theta \tag{10}$$

is satisfied, and by having the instruction for braking produced a certain predetermined time after the instruction for declutching, the cutting blades are brought to a standstill at an invariable point $\theta_A$ forward in the counter-clockwise direction relative to the reference angle $\theta_{11}$.

The angle $\theta_S$ may be detected as an absolute value by means of a position detector such as a selsyn transmitter mounted on one of the cutting blade shafts $1_a$, $1_c$, or it may be detected by counting the number of pulses from a pulse generator mounted on one of the cutting blade shafts. The angle $\theta_S$ may still alternatively be detected by integrating the speed of a tachometer generator mounted on one of the cutting blade shafts. In the method of integrating the tachometer generator speed, the angle $\theta_S$ is given by the following expression:

$$\phi_S = \frac{2\pi}{60} \int_0^t V \cdot dt \tag{11}$$

Combining the equations (9), (10) and (11), we have $$\frac{2\pi}{60} \int_0^t V \cdot dt = \phi_A - \frac{2\pi}{60} (t_{dC} + t_{dD} + t_{dB}) \cdot V_0 - \frac{\pi}{60} \cdot \frac{GD^2}{375 T_B} \cdot V_0^2 \tag{12}$$

Instead of mounting the tachometer generator on one of the cutting blade shafts, one may mount the tachometer generator on the motor shaft $3_s$, since the cutting blade shafts are mechanically coupled through the clutch 2 to the motor shaft. If the motor speed is represented by n [rpm], the motor speed at the moment when the clutch 2 is disengaged is represented by $n_0$ [rpm], and the gear ratio between the motor shaft $3_s$ and the cutting blade shaft $1_{sa}$ is represented by i, then the expression (12) is alternatively written as follows:

$$\frac{2\pi}{60} \int_0^t \frac{n}{i} \cdot dt = \phi_A - \frac{\pi}{60} (t_{dC} + t_{dD} + t_{dB}) \cdot \frac{n_0}{i} - \frac{2\pi}{60} \cdot \frac{GD^2}{375 T_B} \cdot \left(\frac{n_0}{i}\right)^2 \tag{13}$$

The motor speed n at the time $t_6$ when the instruction for declutching is produced is approximately equal to the speed $n_{0\ L\ at\ the\ time\ t_7}$ when the clutch is actually disengaged, so that, substituting n for $n_0$ in the expression (13), we have:

$$\frac{2\pi}{60} \int_0^t \frac{n}{i} \cdot dt = \phi_A - \frac{2\pi}{60} (t_{dC} + t_{dD} + t_{dB}) \cdot \frac{n}{i} - \frac{\pi}{60} \cdot \frac{GD^2}{375 T_B} \cdot \left(\frac{n}{i}\right)^2 \tag{14}$$

If the instruction for declutching is produced when the expression (14) is fulfilled, the value of n in the expression (14) is the cutting blade speed at the moment when the clutch is actually disengaged. In other words, the expression (13) and (14) are practically equivalent to each other. It is for this reason that the instruction for declutching may be produced when the equation (14) is fulfilled. The instruction for braking may be produced when the following equation (15) is fulfilled.

$$\frac{2\pi}{60} \int_0^t \frac{n}{i} \cdot dt = \phi_A - \frac{2\pi}{60} \cdot t_{dB} \cdot \frac{n}{i} - \frac{\pi}{60} \cdot \frac{GD^2}{375T_B} \cdot \left(\frac{n}{i}\right)^2 \quad (15)$$

Production of the instruction for braking upon fulfillment of the equation (15) means such production at the moment $(t_{dC}+t_{dD})$ after the production of the instruction for declutching. Therefore, the system may be so arranged to produce the instruction for braking at the moment $(t_{dC}+t_{dD})$ after the production of the instruction for declutching, instead of the moment when the equation (15) is fulfilled.

Still alternatively, the instruction for declutching may be produced at a fixed moment and the time at which the instruction for braking is produced may be determined by the equation (15). In such a case, the time for the instruction for declutching should be so selected that it preceeds the time for declutching.

It has been described that an operation is performed on the signal from the speed meter mounted on one of the cutting blade shafts $1_{sa}$, $1_{sc}$ or on the motor shaft $3_s$. However, the speed reference signal for the motor 3 may be used for the operation. The difference between the actual speed and the reference speed leads to an error. But, the decrease of the speed of the motor during the cutting is at most several percent, so that the error in the length of the cut of the strip due to the difference between the actual speed and the reference speed is insignificant compared with the tolerance.

Figure 7:
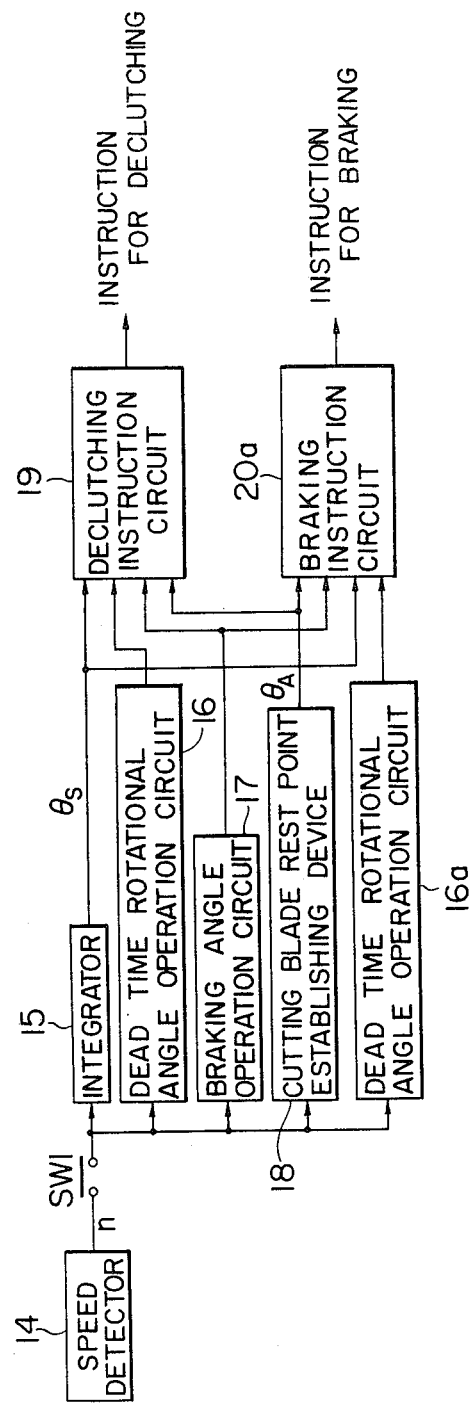

FIGS. 5 through 7 respectively show different embodiments of the invention.

In the embodiment of FIG. 5, a motor speed detector 14 detects the rotational speed n of the motor 3. A speed integrator 15 receives the output signal n of the speed detector 14 via a switch SW1, and performs an operation as expressed by the following equation:

$$\phi_s = \frac{2\pi}{60} \cdot \int_0^t \frac{n}{i} \cdot dt \quad (16)$$

A dead time rotational angle operation circuit 16 receives the output signal n of the speed detector 14 via the switch SW1, and performs an operation to obtain the angle $\theta_C + \theta_D + \theta_B$ through which the cutting blades rotate during the time $(t_{dC}+t_{dD}+t_{dB})$ since the instruction for declutching is produced and until the brake begins to function, i.e., the angle:

$$\frac{2\pi}{60} \cdot \frac{n}{i} \cdot (t_{dC} + t_{dD} + t_{dB}) \quad (17)$$

The operation circuit 16 may comprise a coefficient multiplier which receives n as a variable input and multiplies n by a preadjusted coefficient (constant) representing:

$$\frac{2\pi}{60} \cdot \frac{1}{i} \cdot (t_{dC} + t_{dD} + t_{dB}).$$

A braking angle $\theta_C + \theta_D + \theta_B$ operation circuit 17 receives the output of the speed detector 14 via the switch SW1, and performs an operation to obtain the angle $\theta_E$ since the brake is operated and until the cutting blades $1_a$, $1_c$ are brought to a standstill, i.e., the angle $\theta_C + \theta_D + \theta_B$:

$$\phi_E \frac{\pi}{60} \cdot \frac{GD^2}{375T_B} \cdot \left(\frac{n}{i}\right)^2 \quad (18)$$

The operation circuit 17 may comprise a multiplier which has two input terminals both for receiving n as a variable multiplier and a variable multiplicand, and multiplies n by n, and by a preadjusted coefficient (constant) representing:

$$\frac{\pi}{60} \cdot \frac{GD^2}{375T_B} \cdot \left(\frac{1}{i}\right)^2.$$

A cutting blade rest point establishing device 18 establishes the angle $\theta_A$ from the above mentioned reference point $\theta_{11}$ to the cutting blade rest point $\theta_{10}$. The establishing device 18 may comprise any device capable of providing a voltage signal of adjustable magnitude, for instance a combination of a constant DC voltage source and a voltage divider with adjustable output. The switch SW1 is arranged to be closed when the rotational angle detector 7 detects the reference point.

A declutching instruction circuit 19 receives the output signal of the speed integrator 15, the output signal of the operation circuit 16, the output signal of the operation circuit 17 and the output signal of the establishing device 18, and performs an operation of the equation (14), to produce the instruction for declutching when the equation (14) is fulfilled. The declutching instruction circuit 19 may comprise an adder which receives the outputs of the operation circuits 16 and 17, and the establishing device 18 and obtains the difference between the output of the device 18 and the sum of the outputs of the circuits 16 and 17, thus preforming the operation of the right side of the expression (14), and a comparator which compares the output of the integrator 15 with the output of the adder and produces an output signal when the output of the integrator 15 becomes equal to the output of the adder. The output signal of the comparator is used as the instruction for declutching. A braking instruction circuit 20 produces the instruction for braking at the moment $(t_{dC}+t_{dD})$ after it receives the instruction for declutching which is produced by the declutching instruction circuit 19. In the operation performed by the embodiment of FIG. 5, all the factors except the motor speed n are constant.

According to the embodiment of FIG. 5, the declutching instruction from the declutching instruction circuit 19 and the braking instruction from the braking instruction circuit 20 are utilized to control the flyng shear so that the cutting blades $1_a$, $1_c$ are always brought to a standstill at a position $\theta_A$ in advancement of the reference point $\theta_{11}$.

FIG. 6 shows another embodiment of the invention. In FIG. 6, the same reference numerals designate the corresponding members in FIG. 5. In the embodiment of FIG. 6, a declutching instruction circuit $19_a$ produces the declutching instruction at a fixed angle, responsive to the operation of the rotational angle detector 7, and a dead time rotational angle operation circuit $16_a$ performs an operation to obtain an angle through which the cutting blades rotate during the interval $t_{dB}$ since the braking instruction is produced and until the brake begins to operate, i.e., the angle:

$$\frac{2\pi}{60} \cdot t_{dB} \cdot \frac{n}{i} \qquad (19)$$

The operation circuit 16a may comprise a coefficient multiplier which receives n as a variable input and multiplies n by a preadjusted coefficient (constant) representing:

$$\frac{2\pi}{60} \cdot t_{dB} \cdot \frac{1}{i}$$

A braking instruction circuit 20a receives the output signal from the rotational speed integrator 15, the output signal from the dead time rotational angle operation circuit 16a, the output signal from the braking angle operation circuit 17 and the output signal from the cutting blades rest point establishing device 18, and performs an operation of the equation (15) to produce the braking instruction when the right and left sides are equal to each other. The braking instruction circuit 20a may comprise an adder which receives the outputs of the operation circuits 16a and 17, and the establishing device 18 and obtains the difference between the output of the device 18 and the sum of the outputs of the circuits 16a and 17, thus performing the operation of the right side of the expression (15), and a comparator which compares the output of the integrator 15 with the output of the adder and produces an output signal when the output of the integrator 15 becomes equal to the output of the adder. The output signal of the comparator is used as the instruction for braking. Thus, the declutching instruction is produced at a fixed angle, whereas the angle at which the braking instruction is produced is determined by an operation, and yet the cutting blades are brought to a standstill at a fixed point.

FIG. 7 shows still another embodiment of the invention. In FIG. 7, the same reference numerals designate the corresponding members in FIGS. 5 and 6. In the embodiment of FIG. 7, the declutching instruction circuit 19 receives the output signal of the rotational speed integrator 15, the output signal of the dead time rotational angle operation circuit 16, the output signal of the braking angle operation circuit 17 and the output signal of the cutting blade rest point establishing device 18, and performs an operation of the expression (14) to produce the declutching instruction when the right and left sides accord. The circuit 19 may be formed as explained with reference to FIG. 5. A braking instruction circuit 20a receives the output signal of the rotational speed integrator 15, the output signal of the braking angle operation circuit 17, the output signal of the cutting blade rest angle establishing device 18 and the output signal of the dead time rotational angle operation circuit 16a, and performs an operation of the equation (15) to produce the braking instruction when the right and left sides accord. The circuit 20a may be formed as explained with reference to FIG. 6. Thus, the time for the declutching instruction and the time for the braking instruction are both determined by the respective operations so that the cutting blades are brought to a standstill at a fixed point.

In all of the three embodiments described above, the operations are performed on the actual speed of the motor. However, the rotational speed reference or the rotational speed of the cutting blades V may be alternatively used for the operation.

In place of integrating the rotational speed of the cutting blade or of the motor for obtaining the rotational angle of the cutting blades relative to the reference point, a position detector may be mounted on one of the cutting blade shafts to enable detection of the rotational angle of the cutting blades relative to the reference point.

What is claimed is:

1. In a control apparatus of a flying shear wherein a clutch is actuated to transmit the rotation of a drive motor to a cutting blade to rotate the same for achieving cutting and then the clutch is disengaged and the cutting blade is stopped by means of a brake, the improvement which comprises:
rotational angle indicating means for producing a signal indicating a rotational angle of the cutting blade,
a speed signal generator for generating a signal corresponding to the speed of the cutting blade,
a rest point establishing device for establishing a rest point for the cutting blade,
an operation circuit receiving the output of said rotational angle indicating means and the output of said speed signal generator and performing an operation, for obtaining the angle at which an instruction for declutching is to be produced and the angle at which an instruction for braking is to be produced, and
an instruction circuit responsive to the output of said operation circuit and the output of said rest point establishing device to produce at least one of an instruction for declutching and an instruction for braking.

2. A control apparatus as recited in claim 1, wherein said rotational angle indicating means comprises a speed integrating circuit for integrating the output of said speed signal generator to obtain the rotational angle of the cutting blade.

3. A control apparatus as recited in claim 1 wherein said speed signal generator comprises a speed detector for detecting the actual speed of the cutting blade and said signal corresponding to the speed of the cutting blade is in the form of a signal obtained by detecting the speed of the cutting blade.

4. A control apparatus as recited in claim 1 wherein said signal corresponding to the speed of the cutting blade is in the form of a reference signal for the speed of the cutting blade.

5. A control apparatus as recited in claim 1, wherein said operation circuit comprises:
a dead time rotational angle operation circuit responsive to the output of said speed signal generator to perform an operation for obtaining an angle through which the cutting blade rotates during an interval since the instruction for declutching is produced and until the brake begins to operate, and
a braking angle operation circuit responsive to the output of said speed signal generator to perform an operation for obtaining an angle through which the cutting blade rotates during an interval since the brake is operated and until the cutting blade is brought to a standstill, and
wherein said instruction circuit produces an instruction for declutching in response to the output of said rotational angle indicating means, the output of said dead time rotational angle operation circuit and the output of said braking angle operation circuit, and produces the instruction for braking a predetermined time after the instruction for declutching is produced.

6. A control apparatus as recited in claim 5, wherein said speed signal generator comprises a speed detector for detecting the actual speed of the cutting blade and said signal corresponding to the speed of the cutting blade is in the form of a signal obtained by detecting the speed of the cutting blade.

7. A control apparatus as recited in claim 5, wherein said signal corresponding to the speed of the cutting blade is in the form of a reference signal for the speed of the cutting blade.

8. A control apparatus as recited in claim 1, wherein said operation circuit comprises:

a dead time rotational angle operation circuit responsive to the output of said speed signal generator to perform an operation for obtaining an angle through which the cutting blade rotates during an interval since the instruction for braking is produced and until the brake begins to operate, and a braking angle operation circuit responsive to the output of said speed signal generator to perform an operation for obtaining an angle through which the cutting blade rotates during an interval since the brake is operated and until the cutting blade is brought to a standstill, and wherein said instruction circuit produces an instruction for braking in response to the output of said rotational angle indicating means, the output of said dead time rotational angle operation circuit and the output of said braking angle operation circuit, and produces an instruction for declutching at a predetermined rotational angle.

9. A control apparatus as recited in claim 8, wherein said speed signal generator comprises a speed detector for detecting the actual speed of the cutting blade and said signal corresponding to the speed of the cutting blade is in the form of a signal obtained by detecting the speed of the cutting blade.

10. A control apparatus as recited in claim 8, wherein said signal corresponding to the speed of the cutting blade is in the form of a reference signal for the speed of the cutting blade.

11. A control apparatus as recited in claim 1, wherein said operation circuit comprises:

a first dead time rotational angle operation circuit responsive to the output of said speed signal generator to perform an operation for obtaining an angle through which the cutting blade rotates during an interval since the instruction for declutching is produced and until the brake begins to operate, a second dead time rotational angle operation circuit responsive to the output of said speed signal generator to perform an operation for obtaining an angle through which the cutting blade rotates during an interval since the instruction for braking is produced and until the brake begins to operate, and a braking angle operation circuit responsive to the output of said speed signal generator to perform an operation for obtaining an angle through which the cutting blade rotates during an interval since the brake is operated and until the cutting blade is brought to a standstill, and, wherein said instruction circuit performs a predetermined operation on the output of said rotational angle indicating means and the output of said operation circuit to produce an instruction for declutching and an instruction for braking.

12. A control apparatus as recited in claim 11, wherein said speed signal generator comprises a speed detector for detecting the actual speed of the cutting blade and said signal corresponding to the speed of the cutting blade is in the form of a signal obtained by detecting the speed of the cutting blade.

13. A control apparatus as recited in claim 11, wherein said signal corresponding to the speed of the cutting blade is in the form of a reference signal for the speed of the cutting blade.

* * * * *